(12) United States Patent
Wu

(10) Patent No.: US 6,392,002 B1
(45) Date of Patent: May 21, 2002

(54) URETHANE GOLF BALL

(75) Inventor: Shenshen Wu, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/453,960

(22) Filed: Dec. 3, 1999

Related U.S. Application Data

(63) Continuation-in-part of application No. 09/311,591, filed on May 14, 1999, now Pat. No. 6,210,294.

(51) Int. Cl.[7] .................. C08G 18/76; C08G 18/48; A63B 37/12
(52) U.S. Cl. .................. 528/76; 528/80; 528/83; 528/85; 525/453; 525/460; 525/467; 473/354; 473/374; 473/378
(58) Field of Search .................. 528/76, 80, 83, 528/85; 525/467, 473, 460, 453; 473/354, 374, 378

(56) References Cited

U.S. PATENT DOCUMENTS

| | | | |
|---|---|---|---|
| 3,642,703 A | * 2/1972 | Suzuki | |
| 4,349,657 A | * 9/1982 | Holloway | |
| 4,499,239 A | 2/1985 | Murakami et al. | 525/111 |
| 4,738,999 A | * 4/1988 | Blenner | |
| 4,858,924 A | 8/1989 | Saito et al. | 273/62 |
| 4,914,152 A | 4/1990 | Miyashita et al. | 525/68 |
| 4,968,752 A | 11/1990 | Kawamoto et al. | 525/194 |
| 5,006,297 A | 4/1991 | Brown et al. | 264/234 |
| 5,021,534 A | * 6/1991 | Kawasaki | |
| 5,334,673 A | 8/1994 | Wu | 273/235 |
| 5,484,870 A | 1/1996 | Wu | 528/28 |
| 5,543,467 A | 8/1996 | Hamada et al. | 525/207 |
| 5,565,524 A | 10/1996 | Hamada et al. | 525/208 |
| 5,575,472 A | 11/1996 | Magerman et al. | 29/530 |
| 5,625,003 A | 4/1997 | Kato et al. | 525/208 |
| 5,692,974 A | 12/1997 | Wu et al. | 473/377 |
| 5,733,428 A | 3/1998 | Calabria et al. | 264/134 |
| 5,888,437 A | 3/1999 | Calabria et al. | 264/135 |
| 5,902,855 A | 5/1999 | Sullivan | 525/221 |
| 5,908,358 A | 6/1999 | Wu | 473/378 |
| 6,117,024 A | * 9/2000 | Dewanjee | |

FOREIGN PATENT DOCUMENTS

| | | |
|---|---|---|
| JP | 270723 | * 11/1988 |
| JP | 08-170235 | * 7/1996 |
| JP | 08-187798 | * 7/1996 |
| WO | 9602584 | * 2/1996 |
| WO | WO 98/37929 | 9/1998 |
| WO | 43713 | * 10/1998 |

OTHER PUBLICATIONS

Raj B. Durairaj et al., "Cast Polyurethanes From Resorcinol–Based Aromatic Diols" (Oct. 10–14, 1998).

Raj B. Durairaj, "HER Materials For Polyurethane Applications" (Spring, 1999).

* cited by examiner

Primary Examiner—David J. Buttner
(74) Attorney, Agent, or Firm—Swidler Berlin Shereff Friedman, LLP

(57) ABSTRACT

A golf ball comprising a center, a cover, and optionally, at least one intermediate layer disposed between the center and the cover, wherein at least one of the center, the cover, and the at least one intermediate layer is formed with a polyurethane composition comprising a reaction product of a prepolymer of at least one polyol and at least one polyisocyanate, and at least one curing agent. A polyurethane composition, suitable for forming golf equipment, said composition comprising a reaction product of a prepolymer of at least one polyol and at least one polyisocyanate, and at least one curing agent.

25 Claims, No Drawings

URETHANE GOLF BALL

CROSS-REFERENCE TO RELATED APPLICATIONS

This application is a continuation-in-part of co-pending U.S. patent application Ser. No. 09/311,591, filed May 14, 1999 now U.S. Pat. No. 6,210,294.

FIELD OF THE INVENTION

The invention relates generally to golf balls and, more specifically, to golf ball cores, intermediate layers, and covers formed of a polymer blend comprising a polyurethane composition. The polyurethane composition comprises a prepolymer of a polyisocyanate and a polyol, as well as a diol or diamine curing agent. The golf balls of the present invention have been found to provide desired playing characteristics such as durability and improved resilience.

BACKGROUND OF THE INVENTION

Conventional golf balls can be divided into two general types or groups: solid balls and wound balls. The difference in play characteristics resulting from these different types of constructions can be quite significant. Balls having a solid construction are generally most popular with the average recreational golfer because they provide a durable ball and maximum distance. Other types of solid balls are made with a solid core, usually formed of a crosslinked rubber, that is encased by a cover material. Typically, solid cores are formed of polybutadiene rubber which is chemically crosslinked with a crosslinking agent, such as zinc diacrylate. Solid cores are encased by a tough, cut-proof cover, generally formed of a material such as SURLYN®, an ionomer resin produced by E.I. DuPont de Nemours and Co. of Wilmington, Del.

To a large extent, ionomer resins have replaced balata as a cover material. Chemically, ionomer resins are a copolymer of an olefin and an α,β-ethylenically-unsaturated carboxylic acid having 10–90% of the carboxylic acid groups neutralized by a metal ion. Commercially available ionomer resins include, for example, copolymers of ethylene and methacrylic or acrylic acid, neutralized with metal salts, such as SURLYN® from DuPont and IOTEK® from Exxon Corporation. These ionomer resins are distinguished by the type of metal ion, the amount of acid, and the degree of neutralization.

Surrounding the core with an ionomeric cover material provides a ball that is virtually indestructible by golfers. The core-cover combination imparts a high initial velocity to the ball which results in improved distance. Because the materials used to form solid golf balls are very rigid, solid balls generally have a hard "feel" when struck with a club. Similarly, for the same reason, these solid golf balls have a relatively low spin rate, another factor in providing greater distance.

It is well known in the art to modify the properties of a conventional solid ball by altering the typical single layer core and single cover layer construction to provide a ball having at least one mantle layer disposed between the cover and the core. Like the solid cores, various cover layers, mantle layers, and intermediate layers may be typically formed of polybutadiene which is chemically crosslinked with a crosslinking agent, such as zinc diacrylate. The playing characteristics of multi-layer balls, such as "feel" and compression, can be tailored by varying the properties of one or more of these intermediate layers.

The wound ball, though, remains the preferred ball of more advanced players due to its spin and "feel" characteristics. Wound balls typically have either a solid rubber or liquid center core around which tensioned elastic thread or yarn are wound. This wound core is then covered with a durable cover material, such as SURLYN® from DuPont, or a softer cover material, such as balata or polyurethane. Balata is a natural or synthetic trans-polyisoprene rubber that is the favored cover material for highly-skilled golfers because of its softness. Because wound balls are generally softer and provide more spin than non-wound balls, they enable skilled golfers to have more precise control over golf ball direction, flight profile, and distance. The enhanced control and stopping ability of a balata-covered wound ball is particularly evident on approach shots into the green, where the high spin rate of these balls enables the golfer to stop the ball very near its landing position. Balata-covered balls, however, are easily damaged, and therefore lack the durability required by the recreational golfer.

A number of patents have been issued that are directed towards modifying the properties of layers used in forming wound balls, conventional solid balls, multi-layer balls having dual cover layers, dual core layers, and/or balls having a mantle layer disposed between the cover and the core. For example, U.S. Pat. No. 3,147,324 is directed to a method of making a golf ball having a polyurethane cover.

Polyurethanes have been recognized as useful materials for golf ball covers since about 1960. Polyurethane is the product of a reaction between a polyurethane prepolymer and a curing agent. The polyurethane prepolymer is a product formed by a reaction between a polyol and a diisocyanate. The curing agents used previously are typically diamines or glycols. A catalyst is often employed to promote the reaction between the curing agent and the polyurethane prepolymer.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. The first commercially successful polyurethane covered golf ball was the Titleist® Professional ball, first released in 1993.

Unlike SURLYN® or ionomer-covered golf balls, polyurethane golf ball covers can be formulated to possess the soft "feel" of balata covered golf balls. However, golf ball covers made from polyurethane have not, to date, fully matched SURLYN®-covered golf balls with respect to resilience or the rebound that is a function of the initial velocity of a golf ball after impact with a golf club.

U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a thermosetting polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

Conventional polyurethane elastomers are known to have lower resiliency than SURLYN® and other ionomer resins. It has now been discovered that the use of a polyurethane composition, according to the present invention, in forming golf ball cores, intermediate and mantle layers, and/or covers, can raise the velocity of a golf ball prepared with the composition: (1) closer to the velocities observed with SURLYN®-covered golf balls; and (2) higher than the velocities exhibited using alternative urethane compositions.

SUMMARY OF THE INVENTION

The present invention is directed to a golf ball comprising a center, a cover, and optionally, at least one intermediate layer disposed between the center and the cover, wherein at least one of the center, the cover, and the at least one intermediate layer is formed with a polyurethane composition comprising a reaction product of:

a prepolymer comprising para-phenylene diisocyanate and at least one polyol selected from the group consisting of polyether polyols having the structure:

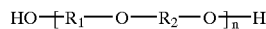

where $R_1$ and $R_2$ are straight or branched hydrocarbon chains, each containing from 1 to 20 carbon atoms, and n is the chain length and ranges from 1 to about 45; polyester polyols having the structure:

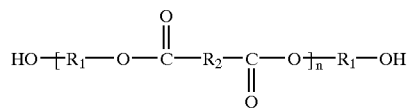

where $R_1$ and $R_2$ are straight or branched hydrocarbon chains, each containing from 1 to 20 carbon atoms, and n is the chain length and ranges from 1 to about 25; polycaprolactone polyols having the structure:

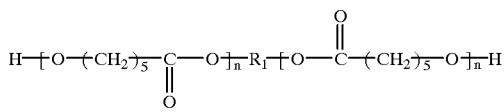

where $R_1$ is a straight or branched hydrocarbon chain containing from 1 to 20 carbon atoms, and n is the chain length and ranges from 1 to about 20; and polycarbonate polyols having

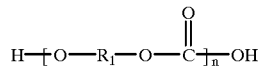

where $R_1$ is predominantly bisphenol A units $-(p-C_6H_4)-C(CH_3)_2-(p-C_6H_4)-$ or derivatives thereof, and n is the chain length and ranges from 1 to about 20.

In one embodiment, the polyol is a polyether polyol selected from the group consisting of polyethylene propylene glycol, polytetramethylene ether glycol, poly(oxypropylene)glycol, and mixtures thereof. Preferably, the polyether polyol comprises polytetramethylene ether glycol.

In another embodiment, the polyol is a polyester polyol selected from the group consisting of polyethylene adipate glycol, polybutylene adipate glycol, polyethylene propylene adipate glycol, ortho-phthalate-1,6-hexanediol, and mixtures thereof. In still another embodiment, the polyol is a polycaprolactone polyol selected from the group consisting of 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, polytetramethylene ether glycol-initiated polycaprolactone, and mixtures thereof. In a further embodiment, the polyol is a polycarbonate polyol comprising polyphthalate carbonate. Preferably, the polyol has a molecular weight from about 600 to about 4000. In one embodiment, the polyol comprises saturated or unsaturated bonds and substituted or unsubstituted aromatic and cyclic groups. In a preferred embodiment, the polyol is present in an amount of about 70 to 98 percent by weight of the prepolymer, the para-phenylene diisocyanate is present in an amount of about 2 to 30 percent by weight of the prepolymer, and the curing agent is present in an amount of about 10 to 110 weight percent of the prepolymer.

In another embodiment, the para-phenylene diisocyanate is present in an amount of about 2 to 12 percent by weight of the prepolymer and preferably, in an amount of about 5 to 8 percent by weight of the prepolymer. Preferably, the at least one curing agent is selected from the group consisting of 1,3-bis(2-hydroxyethoxy)benzene and 1,3-bis-[2-(2-hydroxyethoxy)ethoxy]benzene, and 1,3-bis-{2-[2-(2-hydroxyethoxy)ethoxy]ethoxy}benzene; 1,4-butanediol; resorcinol-di-(β-hydroxyethyl)ether; hydroquinone-di-(β-hydroxyethyl)ether; ethylene glycol; diethylene glycol; polyethylene glycol; polytetramethylene ether glycol having average molecular weights between about 250 to about 4000, and mixtures thereof. Preferably, the polytetramethylene ether glycol has an average molecular weight of between about 250 to about 2000.

In still another embodiment, the amine curing agent is selected from the group consisting of, isomers of 3,5-diethyltoluene-2,4 (2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof. Preferably, the amine curing agent has a molecular weight of about 64 to about 2000.

In a preferred embodiment, the polyurethane composition comprises a reaction product of para-phenylene diisocyanate, polytetramethylene ether glycol, and mixtures of 3,5-dimethylthio-2,4-toluenediamine and 3,5-dimethylthio-2,6-toluenediamine.

In another preferred embodiment, the cover is formed with the polyurethane composition. In one embodiment, the ball comprises at least one said intermediate layer and wherein at least one said layer is comprised of the polyurethane composition. In still another embodiment, the center is a fluid-filled center, a solid center, a gel center, or a hollow center. In yet another embodiment, the polyurethane composition further comprises a density-modifying filler.

The present invention is also directed to a polyurethane composition, suitable for forming golf equipment, comprising a reaction product of a prepolymer of paraphenylene diisocyanate and at least one polyol selected from the group consisting of polyether polyols having the structure:

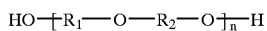

where $R_1$ and $R_2$ are straight or branched hydrocarbon chains, each containing carbon numbers from 1 to 20, and n is the chain length and ranges from 1 to about 45; polyester polyols having the structure:

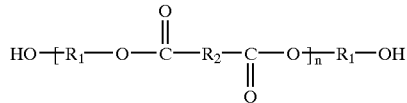

where $R_1$ and $R_2$ are straight or branched hydrocarbon chains, each containing carbon numbers from 1 to 20, and n is the chain length and ranges from 1 to about 25; polycaprolactone polyols having the structure:

where $R_1$ is a straight or branched hydrocarbon chain containing carbon numbers from 1 to 20, and n is the chain length and ranges from 1 to about 20; and polycarbonate polyols having the structure:

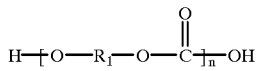

where $R_1$ is predominantly bisphenol A units $-(p-C_6H_4)-C(CH_3)_2-(p-C_6H_4)-$ or derivatives thereof, and n is the chain length and ranges from 1 to about 20.

In one embodiment, the polyol is a polyether polyol selected from the group consisting of polyethylene propylene glycol, polytetramethylene ether glycol, poly(oxypropylene)glycol, and mixtures thereof. In a preferred embodiment, the polyether polyol comprises polytetramethylene ether glycol.

In another embodiment, the polyol is a polyester polyol selected from the group consisting of polyethylene adipate glycol, polybutylene adipate glycol, polyethylene propylene adipate glycol, ortho-phthalate-1,6-hexanediol, and mixtures thereof.

In still another embodiment, the polyol is a polycaprolactone polyol selected from the group consisting of 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, polytetramethylene ether glycol-initiated polycaprolactone, and mixtures thereof. In yet another embodiment, the polyol is a polycarbonate polyol comprising polyphthalate carbonate.

Preferably, the polyol has a molecular weight from about 600 to about 4000. In one embodiment, the polyol comprises saturated or unsaturated bonds and substituted or unsubstituted aromatic and cyclic groups.

In a preferred embodiment, the polyol is present in an amount of about 70 to 98 percent by weight of the prepolymer, the para-phenylene diisocyanate is present in an amount of about 2 to 30 percent by weight of the prepolymer, and the curing agent is present in an amount of about 10 to 110 weight percent of the prepolymer. In a more preferred embodiment, the para-phenylene diisocyanate is present in an amount of about 2 to 12 percent by weight of the prepolymer. Most preferably, the para-phenylene diisocyanate is present in an amount of about 5 to 8 percent by weight of the prepolymer.

In one embodiment, the at least one curing agent is selected from the group consisting of 1,3-bis(2-hydroxyethoxy)benzene and 1,3-bis-[2-(2-hydroxyethoxy)ethoxy]benzene, and 1,3-bis-{2-[2-(2-hydroxyethoxy)ethoxy]ethoxy}benzene; 1,4-butanediol; resorcinol-di-(β-hydroxyethyl)ether; hydroquinone-di-(β-hydroxyethyl)ether; ethylene glycol; diethylene glycol; polyethylene glycol; polytetramethylene ether glycol having average molecular weights between about 250 to about 4000, and mixtures thereof. Preferably, the polytetramethylene ether glycol has a molecular weight between about 250 and 2000.

In another embodiment, the amine curing agent is selected from the group consisting of isomers of 3,5-diethyltoluene-2,4(2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof. Preferably, the amine curing agent has a molecular weight of about 64 to about 2000.

In a preferred embodiment, the polyurethane composition comprises a reaction product of para-phenylene diisocyanate, polytetramethylene ether glycol, and mixtures of 3,5-dimethylthio-2,4-toluenediamine and 3,5-dimethylthio-2,6-toluenediamine. In another embodiment, the polyurethane composition further comprises a density-modifying filler.

DESCRIPTION OF THE PREFERRED EMBODIMENTS

This invention is particularly directed towards golf balls having an intermediate layer, and/or a cover formed of a polyurethane composition (the "polyurethane composition") comprising the reaction product of a prepolymer comprising at least one polyisocyanate, preferably para-phenylene diisocyanate, and at least one polyol, and a curing agent wherein the resultant golf ball possesses improved resiliency and initial velocity.

Golf balls formed according to the invention may, for example, have a one-piece construction formed from a homogeneous mass consisting entirely of the polyurethane composition of the invention. Such balls may further include, if desired, blends of conventional golf ball cover and/or intermediate layer materials, such as those discussed herein. One-piece balls, formed with the materials disclosed herein, are quite durable, but do not provide great distance because of relatively high spin and low velocity. Other embodiments of the present invention include two-piece, multi-component, and wound balls having cores, liquid centers, intermediate layers, and/or covers comprising the polyurethane composition disclosed herein.

As used herein, the term "golf ball core" is used to refer to any portion of a golf ball contained within the cover. In the case of a golf ball having three or more layers, the term "golf ball core" includes at least one inner layer and typically refers to a center surrounded by at least one intermediate layer. Such balls are known as "dual core" golf balls. The center may be solid, gel-filled, hollow, or fluid-filled. The term "inner core" is used interchangeably with "center" or "golf ball center," while the term "outer core" is used interchangeably with "intermediate layer" or "at least one intermediate layer." For example, one optional type of intermediate layer is a tensioned elastomeric material wound about the center. When a tensioned elastomeric material is included as an intermediate layer, the compositions of the invention may be incorporated into the elastomeric material, the center, or both. An intermediate layer may be included within a ball having, for example, a single layer or multi-layer cover, a single layer or multilayer core, both a single layer cover and core, or both a multilayer cover and a multilayer core. Intermediate layers of the type described above are sometimes referred to in the art, and, thus, herein as well, as an inner cover layer, as an outer core layer, or as a mantle layer.

The polyurethane composition of the present invention comprises the reaction product of polyisocyanate, at least one polyol, and at least one curing agent. Suitable polyisocyanates, for example, include para-phenylene diisocyanate ("PPDI"), 4,4'-diphenylmethane diisocyanate ("MDI"), polymeric MDI, toluene diisocyanate ("TDI"), 3,3'-dimethyl-4,4'-biphenylene diisocyanate ("TODI"), isophoronediisocyanate ("IPDI"), 4,4'-dicyclohexylmethane diisocyanate ("HMDI"), and mixtures thereof. Polyisocyanates are known to those skilled in the art as having more than one isocyanate group, e.g., di-, tri-, and tetra-isocyanate. Preferably, the polyisocyanate is PPDI.

Suitable polyols include, but are not limited to, polybutadiene glycol, polyether polyols, polyester polyols, polycaprolactone polyols, and polycarbonate polyols. Preferred polyether polyols are those polyols that have the generic structure:

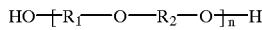

where $R_1$ and $R_2$ are straight or branched hydrocarbon chains, each containing from 1 to about 20 carbon atoms, and n ranges from 1 to about 45. Examples include, but are not limited to, polyethylene propylene glycol, polytetramethylene ether glycol, polyoxypropylene glycol, and mixtures thereof. The hydrocarbon chain can have saturated or unsaturated bonds and substituted or unsubstituted aromatic and cyclic groups. The preferred polyether polyol of the present invention is polytetramethylene ether glycol ("PTMEG").

Preferred polyester polyols are those polyols that have the generic structure:

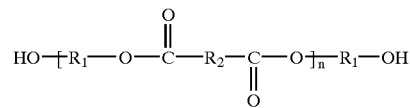

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

Preferred polycaprolactone polyols are those polyols that have the generic structure:

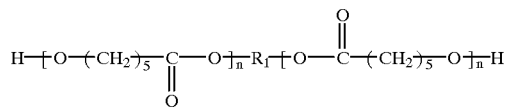

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

Preferred polycarbonate polyols are those polyols that have the generic structure:

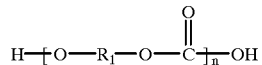

where $R_1$ is predominantly bisphenol A units -(p-$C_6H_4$)—$C(CH_3)_2$-(p-$C_6H_4$)— or derivatives thereof, and n is the chain length and ranges from 1 to about 20. Suitable polycarbonates include, but are not limited to, polyphthalate carbonate. The hydrocarbon chain can have saturated or unsaturated bonds, or substituted or unsubstituted aromatic and cyclic groups.

The most preferred polyols for use with the invention include polytetramethylene ether glycol, polyethylene adipate glycol, polybutylene adipate glycol, and diethylene glycol initiated polycaprolactone. In a particular embodiment, the molecular weight of the polyol is from about 200 to about 4000.

At least one of a diol, triol, tetraol, hydroxy-terminated, or polyamine curing agent may be added to the aforementioned polymer composition. The hydroxy-terminated curatives of the present invention have the following general chemical structure:

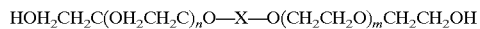

where n and m each separately have values of 0, 1, 2, or 3, and where X is ortho-phenylene, meta-phenylene, para-phenylene, ortho-cyclohexyl, meta-cyclohexyl, or para-cyclohexyl. Preferably, the values of n and m are 1 or 2.

Preferred hydroxy-terminated curatives for use in the present invention include at least one of 1,3-bis(2-hydroxyethoxy)benzene and 1,3-bis-[2-(2-hydroxyethoxy)ethoxy]benzene, and 1,3-bis-{2-[2-(2-hydroxyethoxy)ethoxy]ethoxy}benzene; 1,4-butanediol; resorcinol-di-(β-hydroxyethyl)ether; and hydroquinone-di-(β-hydroxyethyl) ether. Preferably, the hydroxy-terminated curatives have molecular weights ranging from about 48 to 2000.

Addition of polyamine curatives to the above composition has been found to improve cut, shear, and impact resistance of the resultant balls. The polyamine curatives of the present invention have the general formula:

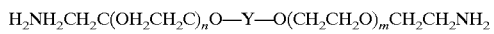

where n and m each separately have values of 0, 1, 2, or 3, and where Y is ortho-cyclohexyl, meta-cyclohexyl, para-cyclohexyl, ortho-phenylene, meta-phenylene, or para-phenylene. Preferred polyamine curatives include, but are not limited to, isomers of 3,5-diethyltoluene-2,4 (2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, N,N'-dialkyldiamino diphenyl methane, and mixtures thereof. Suitable polyamine curatives, which include primary and secondary amines, preferably have molecular weights ranging from about 64 to about 2000.

Both the hydroxy-terminated and amine curatives can comprise saturated, unsaturated, aromatic, and cyclic groups. Additionally, the hydroxy-terminated and amine curatives can comprise halogen groups. Suitable diol, triol, and tetraol groups include ethylene glycol, diethylene glycol, polyethylene glycol, lower molecular weight poly-tetramethylene ether glycol, and mixtures thereof. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additional fillers, such as foaming agents, glass spheres, and various metals, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose.

Core portions of golf balls formed according to the invention are typically from a variety of elastomeric materials. A representative elastomer base composition for forming at least a portion of a golf ball core prepared in accordance with the present invention comprises a base rubber, a crosslinking agent and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, metal, glass spheres and the like. The cores of golf balls formed according to the invention may be solid; hollow; fluid-filled, such as a liquid or gas, including air; or semi-solid filled; one-piece or multi-component cores; or they may be, if desired, wound.

In those embodiments wherein the cover or inner cover layer of the golf ball is formed with the polyurethane composition according to the invention, the cover may be molded about the core in accordance with the teaching of U.S. Pat. Nos. 5,733,428 and 5,888,437, which are incorporated herein by express reference thereto.

The term "about," as used herein in connection with one or more numbers or numerical ranges, should be understood to refer to all such numbers, including all numbers in a range.

EXAMPLE

The following example is provided for illustrative purposes only and is not to be construed as limiting the scope of the invention in any manner. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. However, when referring to the compression of a core, it is preferred to use a compressive load measurement.

Example 1

Comparison of a Conventional Golf Ball with a Golf Ball Produced According to the Invention Three identically-constructed golf balls were prepared, each comprising a liquid-filled center, a wound layer, and a cover. The first golf ball ("Control Formulation") has a cover formed with a conventional polyurethane composition comprising a reaction product of 4,4'-diphenylmethane diisocyanate ("MDI"), polytetramethylene ether glycol, and polytetramethyleneoxide-di-p-aminobenzoate (VERSALINK® P-250). The second golf ball ("Formulation I") has a cover layer formed of a polyurethane composition comprising a reaction product of 4,4'-diphenylmethane diisocyanate ("MDI"), polytetramethylene ether glycol ("PTMEG"), and a mixture of 3,5-dimethylthio-2,4-toluenediamine and 3,5-dimethylthio-2,6-toluenediamine curatives (Ethacure® 300). The third golf ball ("Formulation II") has a cover layer formed with the polyurethane composition of the resent invention that comprises a reaction product of para-phenylene diisocyanate ("PPDI"), polytetramethylene ether glycol ("PTMEG"), and a mixture of 3,5-dimethylthio-2,4-toluenediamine and 3,5-dimethylthio-2,6-toluenediamine curatives (Ethacure®

300). A color dispersion (HCC-19584 at 3.5%) was added to the cover formulations used for all three golf balls. The golf balls were prepared and processed according to methods described in U.S. Pat. Nos. 5,733,428 and 5,888,437. The formulations of all three golf balls are set forth in Table 1 below.

TABLE 1

Formulations

| Materials | Control Formulation | Formulation I | Formulation II |
|---|---|---|---|
| MDI - PTMEG Prepolymer[1] | 1 eq. | 1 eq. | — |
| PPDI - PTMEG Prepolymer[2] | — | — | 1 eq. |
| VERSALINK ® P-250[3] | 0.95 eq. | — | — |
| ETHACURE ® 300[4] | — | 0.95 eq. | 0.95 eq. |
| HCC-19584 Color Dispersion[5] | 3.5% | 3.5% | 3.5% |

[1]Betamate ® 24.010, an MDI-based PTMEG prepolymer at 9.1% NCO, manufactured by Essex Specialty Products, Inc.
[2]Vibrathane ® LFPXA 950, a PPDI-based PTMEG prepolymer at 5.46% NCO, manufactured by Uniroyal Chemical Company, Inc.
[3]An oligomeric diamine curative manufactured by Air Products and Chemicals, Inc.
[4]Isomers of 3,5-dimethylthio-2,4-toluenediamine and 3,5-dimethylthio-2,6-toluenediamine curatives, manufactured by Albemarle Corporation.
[5]A color dispersion manufactured by Harwick Chemical Manufacturing Corporation.

As seen in Table 2 below, the golf ball prepared according to the present invention (Formulation II) exhibits a 1.9-ft/s improvement in initial velocity compared to the velocity measured for the control golf ball. An increase of 1.9 ft/s in the golf ball initial velocity, as is well-known to those of ordinary skill in the art, is very significant. In efforts to achieve initial velocities as close as possible to the maximum limit of 255 ft/s, set by the USGA, the golf ball prepared according to the present invention affords an increase in the initial velocity that approaches this value. Additionally, the golf ball prepared according to the present invention concurrently exhibited a lower compression and hardness values (i.e., better "feel") than the golf ball made with the control formulation.

The golf ball prepared according to the current invention also exhibited a 0.3-ft/s increase in initial velocity compared to the ball prepared according to Formulation I. This increase is also significant, as one of ordinary skill in the art would readily recognize, especially true as the velocity approaches the USGA maximum velocity. Along these lines, the golf ball prepared according to the current invention exhibits this increased velocity coupled with a concurrent decrease in compression and hardness. The decrease in these two values allows the golf ball prepared according to the current invention to be a long ball (high velocity) while having good feel (decreased compression and hardness), improvements that will be well-received among recreational and professional golfers alike.

TABLE 2

Golf Ball Properties

| Physical Properties | Control Formulation | Formulation I | Formulation II |
|---|---|---|---|
| Size, in: nameplate | 1.685 | 1.693 | 1.690 |
| Size, in: equator | 1.684 | 1.689 | 1.687 |
| Weight, oz | 1.605 | 1.611 | 1.614 |

TABLE 2-continued

Golf Ball Properties

| Physical Properties | Control Formulation | Formulation I | Formulation II |
|---|---|---|---|
| Compression, Atti | 94 | 90 | 89 |
| Cover Hardness, Shore D | 55 | 54 | 52 |
| Ball Initial Velocity, ft/s | 252.16 | 253.74 | 254.02 |
| Impact up to 600X | no failure | no failure | no failure |

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a center, a cover, and optionally, at least one intermediate layer disposed between the center and the cover, wherein at least one of the center, the cover, and the at least one intermediate layer is formed with a polyurethane composition comprising a reaction product of:

a prepolymer comprising para-phenylene diisocyanate and at least one polyol selected from the group consisting of polyether polyols having the structure:

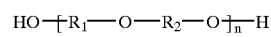

$$HO-[R_1-O-R_2-O]_n-H$$

where $R_1$ and $R_2$ are straight or branched hydrocarbon chains, each containing from 1 to 20 carbon atoms, and n ranges from 1 to about 45;

polyester polyols having the structure:

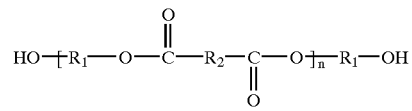

$$HO-[R_1-O-\overset{\overset{O}{\|}}{C}-R_2-\overset{\overset{O}{\|}}{C}-O]_n-R_1-OH$$

where $R_1$ and $R_2$ are straight or branched hydrocarbon chains, each containing from 1 to 20 carbon atoms, and n ranges from 1 to about 25;

polycaprolactone polyols having the structure:

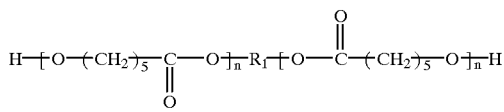

$$H-[O-(CH_2)_5-\overset{\overset{O}{\|}}{C}-O]_n-R_1-[O-\overset{\overset{O}{\|}}{C}-(CH_2)_5-O]_n-H$$

where $R_1$ is a straight or branched hydrocarbon chain containing from 1 to 20 carbon atoms, and n ranges from 1 to about 20; and polycarbonate polyols having the structure:

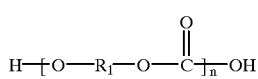

$$H-[O-R_1-O-\overset{\overset{O}{\|}}{C}]_n-OH$$

where $R_1$ is predominantly bisphenol A units -(p-$C_6H_4$)—C($CH_3$)$_2$-(p-$C_6H_4$)— or derivatives thereof, and n is the chain length and ranges from 1 to about 20; and at least one of a hydroxy-terminated curing agent selected from the group consisting of 1,3-bis(2-hydroxyethoxy) benzene and 1,3-bis-[2-(2-hydroxyethoxy)ethoxy] benzene, and 1,3-bis-{2-[2-(2-hydroxyethoxy)ethoxy] ethoxy}benzene; resorcinol-di-(β-hydroxyethyl) ether; hydroquinone-di-(β-hydroxyethyl)ether; ethylene glycol; diethylene glycol; polyethylene glycol; polytetramethylene ether glycol having average molecular weights between about 250 to 4000; and mixtures thereof or an amine curing agent.

2. The golf ball of claim 1, wherein the polyol is a polyether polyol selected from the group consisting of polyethylene propylene glycol, polytetramethylene ether glycol, poly(oxypropylene)glycol, and mixtures thereof.

3. The golf ball of claim 2, wherein the polyether polyol comprises polytetramethylene ether glycol.

4. The golf ball of claim 1, wherein the polyol is a polyester polyol selected from the group consisting of polyethylene adipate glycol, polybutylene adipate glycol, polyethylene propylene adipate glycol, ortho-phthalate-1,6-hexanediol, and mixtures thereof.

5. The golf ball of claim 1, wherein the polyol is a polycaprolactone polyol selected from the group consisting of 1,6-hexanediol-initiated polycaprolactone; diethylene glycol initiated polycaprolactone; trimethylol propane initiated polycaprolactone; neopentyl glycol initiated polycaprolactone; 1,4-butanediol-initiated polycaprolactone; polytetramethylene ether glycol-initiated polycaprolactone; and mixtures thereof.

6. The golf ball of claim 1, wherein the polyurethane composition further comprises a density-modifying filler.

7. The golf ball of claim 1, wherein the polyol has a molecular weight from about 600 to about 4000.

8. The golf ball of claim 1, wherein the polyol comprises saturated or unsaturated bonds and substituted or unsubstituted aromatic and cyclic groups.

9. The golf ball of claim 1, wherein the polyol is present in an amount of about 70 to 98 percent by weight of the prepolymer, the para-phenylene diisocyanate is present in an amount of about 2 to 30 percent by weight of the prepolymer, and the curing agent is present in an amount of about 10 to 110 weight percent of the prepolymer.

10. The golf ball of claim 9, wherein the para-phenylene diisocyanate is present in an amount of about 2 to 12 percent by weight of the prepolymer.

11. The golf ball of claim 10, wherein the para-phenylene diisocyanate is present in an amount of about 5 to 8 percent by weight of the prepolymer.

12. The golf ball of claim 1, wherein the at least one hydroxy-terminated curing agent has a molecular weight from about 48 to 2000 and is selected from the group consisting of 1,3-bis(2-hydroxyethoxy)benzene and 1,3-bis-[2-(2-hydroxyethoxy) ethoxy]benzene, and 1,3-bis-{2-[2-(2-hydroxyethoxy)ethoxy]ethoxy}benzene; resorcinol-di-(β-hydroxyethyl)ether; hydroquinone-di-(β-hydroxyethyl) ether; ethylene glycol; diethylene glycol; polyethylene glycol; and mixtures thereof.

13. The golf ball of claim 1, wherein the polytetramethylene ether glycol has an average molecular weight between about 250 to 2000.

14. The golf ball of claim 1, wherein the amine curing agent is selected from the group consisting of isomers of 3,5-diethyltoluene-2,4(2,6)-diamines, isomers of 3,5-dimethylthio-2,4(2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

15. The golf ball of claim 14, wherein the amine curing agent has a molecular weight of about 64 to about 2000.

16. The golf ball of claim 1, wherein the polyurethane composition comprises a reaction product of para-phenylene diisocyanate, polytetramethylene ether glycol, and mixtures of 3,5-dimethylthio-2,4-toluenediamine and 3,5-dimethylthio-2,6-toluenediamine.

17. The golf ball of claim 1, wherein the cover is comprised of the polyurethane composition.

18. The golf ball of claim 1, wherein the ball comprises at least one said intermediate layer and wherein at least one said layer is comprised of the polyurethane composition.

19. The golf ball of claim 1, wherein the center is a fluid-filled center, a solid center, a gel center, or a hollow center.

20. A polyurethane composition, suitable for forming golf equipment, comprising a reaction product of:
    a prepolymer of para-phenylene diisocyanate and polytetramethylene ether glycol; and
    at least one amine curing agent comprising mixtures of 3,5-dimethylthio-2,4-toluenediamine, and 3,5-dimethylthio-2,6-toluenediamine.

21. The composition of claim 20, wherein the polyol is present in an amount of about 70 to 98 percent by weight of the prepolymer, the para-phenylene diisocyanate is present in an amount of about 2 to 30 percent by weight of the prepolymer, and the curing agent is present in an amount of about 10 to 110 weight percent of the prepolymer.

22. The composition of claim 21, wherein the para-phenylene diisocyanate is present in an amount of about 2 to 12 percent by weight of the prepolymer.

23. The composition of claim 22 wherein the para-phenylene diisocyanate is present in an amount of about 5 to 8 percent by weight of the prepolymer.

24. The golf ball of claim 20, wherein the polytetramethylene ether glycol has an average molecular weight between about 250 to 2000.

25. The composition of claim 20, wherein the polyurethane composition further comprises a density-modifying filler.

* * * * *